(12) United States Patent
Andersson et al.

(10) Patent No.: US 9,187,908 B2
(45) Date of Patent: Nov. 17, 2015

(54) DECORATIVE WELDING ROD FOR SURFACE COVERINGS

(75) Inventors: Christer Andersson, Kallinge (SE); Ake Pettersson, Ronneby (SE)

(73) Assignee: TARKETT GDL S.A., Lentzweiler (LU)

( * ) Notice: Subject to any disclaimer, the term of this patent is extended or adjusted under 35 U.S.C. 154(b) by 607 days.

(21) Appl. No.: 13/500,505

(22) PCT Filed: Oct. 14, 2009

(86) PCT No.: PCT/EP2009/063417
§ 371 (c)(1),
(2), (4) Date: May 16, 2012

(87) PCT Pub. No.: WO2011/044935
PCT Pub. Date: Apr. 21, 2011

(65) Prior Publication Data
US 2013/0051904 A1  Feb. 28, 2013

(51) Int. Cl.
| | |
|---|---|
| *B29C 65/00* | (2006.01) |
| *B29C 65/18* | (2006.01) |
| *B29C 65/12* | (2006.01) |
| *B29C 47/04* | (2006.01) |
| *C08L 27/06* | (2006.01) |
| *E04F 15/14* | (2006.01) |
| *E04F 15/02* | (2006.01) |
| *B29B 7/38* | (2006.01) |
| *B29B 7/90* | (2006.01) |
| *E04F 15/10* | (2006.01) |
| *B29C 47/38* | (2006.01) |
| *B29C 47/60* | (2006.01) |
| *B29C 47/00* | (2006.01) |
| *B29K 27/06* | (2006.01) |
| *B29L 31/00* | (2006.01) |

(52) U.S. Cl.
CPC ............. *E04F 15/02005* (2013.01); *B29B 7/38* (2013.01); *B29B 7/90* (2013.01); *B29C 47/046* (2013.01); *B29C 47/385* (2013.01); *B29C 47/6087* (2013.01); *B29C 65/125* (2013.01); *B29C 66/305* (2013.01); *B29C 66/71* (2013.01); *C08L 27/06* (2013.01); *E04F 15/10* (2013.01); *B29C 47/0016* (2013.01); *B29K 2027/06* (2013.01); *B29L 2031/732* (2013.01); *C08L 2205/02* (2013.01); *Y10T 403/477* (2015.01)

(58) Field of Classification Search
None
See application file for complete search history.

(56) References Cited

U.S. PATENT DOCUMENTS

| | | | | |
|---|---|---|---|---|
| 3,356,634 | A * | 12/1967 | McGinley | 524/524 |
| 3,388,196 | A * | 6/1968 | Farrell | 264/75 |
| 3,775,359 | A * | 11/1973 | Georgiana et al. | 524/114 |
| 4,429,071 | A * | 1/1984 | Itoh et al. | 524/569 |
| 4,889,673 | A * | 12/1989 | Takimoto | 264/118 |
| 5,246,765 | A * | 9/1993 | Lussi et al. | 428/203 |
| 6,998,170 | B2 * | 2/2006 | Balmer et al. | 428/221 |
| 2008/0234414 | A1* | 9/2008 | Godwin et al. | 524/112 |
| 2008/0242802 | A1* | 10/2008 | Noguchi et al. | 525/239 |

FOREIGN PATENT DOCUMENTS

| | | |
|---|---|---|
| EP | 0 950 501 A1 | 10/1999 |
| JP | 57-069008 A | 4/1982 |
| JP | 5-125356 A | 5/1993 |
| WO | WO 89/05228 A1 | 6/1989 |

* cited by examiner

*Primary Examiner* — Jeffrey Wollschlager
(74) *Attorney, Agent, or Firm* — Reinhart Boerner Van Deuren P.C.

(57) ABSTRACT

The present invention relates to a multicolor decorative welding rod (3) and a method to produce a multicolor decorative welding rod, said welding rod comprising a PVC-based component A and a PVC-based component B, in a ratio of component A/component B comprised between 10/90 to 50/50, said components A and B being associated in such a way that the composition of said component A comprises a PVC having a higher melt viscosity and/or a higher melting point, than the PVC of said component B, said components A and B being of a different color.

12 Claims, 1 Drawing Sheet

DECORATIVE WELDING ROD FOR SURFACE COVERINGS

FIELD OF THE INVENTION

The present invention relates to a decorative welding rod for joining elements of a surface covering and to a method for producing such a decorative welding rod.

PRIOR ART AND RELATED TECHNICAL BACKGROUND

Surface coverings, particularly PVC-based surface coverings, are widely used to decorate buildings or houses surfaces as they are more pleasant, more aesthetic and more comfortable than painted surfaces. However, these surface coverings, especially floor coverings, are generally produced in limited sizes that have to be joined one to the others. For this purpose, the use of a welding rod is well known. Usually, a round cross-section thermofusible welding rod is introduced in a hot-air welding device which heats the welding rod so that it penetrates into the space between two pieces of adjacent floor-covering elements and joins them together. Usually, once cooled-down, the excess of welding rod is cut off, or skived, with a "U"-shaped cutter or a similar tool (knife).

Welding rods are usually polymeric compositions having good adhesion to the covering elements to be joined, and allowing the welding rod to have flexibility at temperatures lower than the composition of the elements to be joined, while being easily cut off after welding.

For floor coverings having a multicolour decorative pattern, it has been suggested to use multicoloured welding rods. Thus, from an aesthetic point of view, the welding rod has to emulate the aspect or the pattern of the surface covering.

Generally, for PVC-based coverings, welding rods are PVC-based compositions of a single colour and are produced by extrusion. However, extruded coloured welding rods appear as a seam of a contrasting colour creating a discontinuity in the decorative pattern, as they are unable to properly reproduce a complex multicoloured pattern.

To address this issue and to maintain the continuity of decorative pattern, welding rods can comprise the coloured particles or granules of the surface covering the rods have to join. However, a welding rod composition comprising such particles, generally hard particles, can not be extruded without damaging the extrusion device, making thus such welding rods hard to obtained by extrusion. Therefore, for floor coverings, U.S. Pat. No. 5,635,266 has proposed a PVC-based and patterned welding rod obtained by preparing a sheet of coloured vinyl granules, colour-matched to the flooring that is to be seamed and with pigmented granules, by cutting strips of this sheet and by placing them in a mold and compressing them to form half-round rods.

AIMS OF THE INVENTION

The present invention aims to provide a multicolour decorative welding rod and a method to produce such a decorative welding rod that do not have the drawbacks of the prior art.

The invention aims to provide a multicolour decorative welding rod visually integrated to the pattern of a surface covering, and a method to produce this decorative welding rod.

SUMMARY OF THE INVENTION

The present invention relates to a multicolour decorative welding rod for joining elements of a decorative surface covering, said welding rod comprising a PVC-based component A and a PVC-based component B, in a ratio of component A/component B comprised between 10/90 to 50/50, said components A and B being associated in such a way that the composition of said component A comprises a PVC having a higher melt viscosity and/or a higher melting point, than the PVC of said component B, said components A and B being of a different colour.

According to particular embodiments, the welding rod may comprise one, or a combination, of any of the following characteristics:
   the PVC of component A has a k-value of between 65 to 80 and the PVC of component B has a k-value of between 57 to 65,
   the component A comprises a PVC having a k-value of 70,
   the component B comprises a PVC polymer having a k-value of 62,
   the component B comprises up to 50 phr of an additional PVC polymer having a k-value of 60,
   the ratio of component A/component B is 30/70, and component A comprises a PVC having a k-value of 70 and component B comprises a PVC polymer having a k-value of 62 and 26 phr of a PVC polymer having a k-value of 60.

The "K-VALUE" of PVC is a measure of the molecular weight of PVC, based on measurements of viscosity of a PVC solution. Low K-values imply low molecular weight and high K-values imply high molecular weight. According to Perkins, G. G. A. et. al., in *Journal of Vinyl Technology*, 1993, 15, p 108, a k-value usually ranges between 50 and 80, which is equivalent, in terms of Molecular Weight (MW) to about 40 000 to 168 000 MW the measurement is done with 1% in cyclohexanone (Table 1).

TABLE 1

Relationship between intrinsic viscosity, k-value and approximate molecular weight for PVC.

| Intrinsic viscosity, [ η ] | k-value | Mη | Mw |
| --- | --- | --- | --- |
| 0.52 | 50 | 20,000 | 40,000 |
| 0.67 | 57 | 27,500 | 55,000 |
| 0.92 | 67 | 41,000 | 82,500 |
| 1.08 | 72 | 50,000 | 101,000 |
| 1.30 | 79 | 62,500 | 123,500 |
| 1.60 | 87 | 81,000 | 168,000 |

The invention relates also to a method to produce a multicolour decorative welding rod, said method comprising the steps of mixing the component A in the form of granules and the component B in the form of a powder, and the step of extruding the mixture to obtain said welding rod.

According to particular embodiments, the method according to the invention may comprise one, or a combination, of any of the following characteristics:
   the component A is obtained by granulating a rod obtained by a separated extrusion step,
   the granules of component A are obtained by shredding a sheet,
   the component A is in the form of granules having a size up to 6 mm.

The present invention also relates to a floor covering comprising a weld realised with the welding rod herein described.

SHORT DESCRIPTION OF THE DRAWINGS

DETAILED DESCRIPTION OF THE INVENTION

A welding rod for joining surface covering elements has to conciliate aesthetical requirements and mechanical requirements (flexibility, adhesion, . . . ) that are different from those of floor-covering elements.

The present invention relates to a PVC-based welding rod 3, and to a method for producing such a decorative welding rod, for joining decorative surface covering elements 1, particularly PVC-based covering elements. The welding rod 3 comprises two PVC-based components (component A and component B) having a different composition. Preferably, the ratio of component A/component B is comprised between 10/90 to 50/50.

In the welding rod according to the invention, the PVC of component A and the PVC component B have either a different viscosity and/or a different melting point. Preferably, the PVC of component A has a higher viscosity and/or a higher melting point than the PVC of component B.

Any, or both components A and B, may comprise a single PVC polymer, or a mixture of PVC polymers having different molecular weights.

Figure 1:
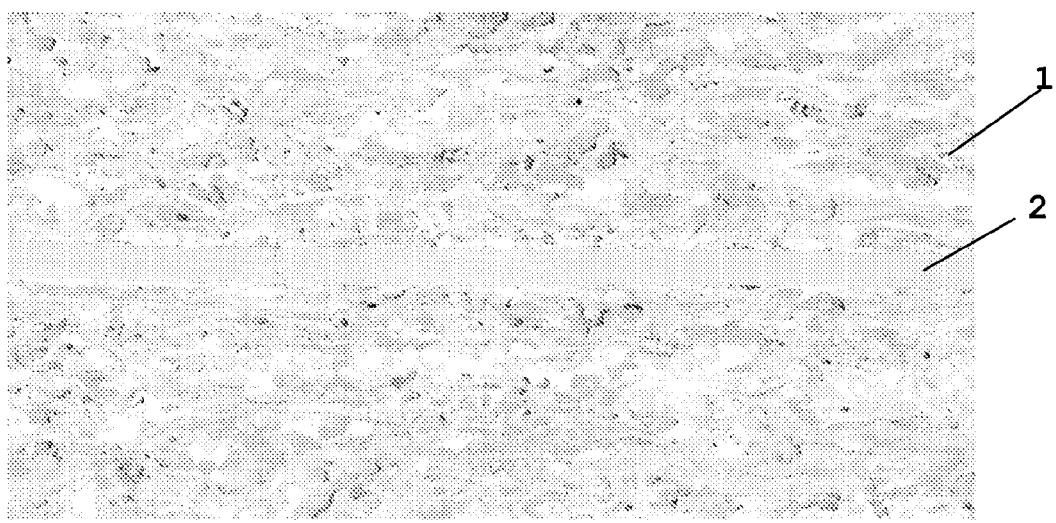
FIG. 1 represents a welding rod according to the prior art joining jasped surface covering elements.
Figure 2:
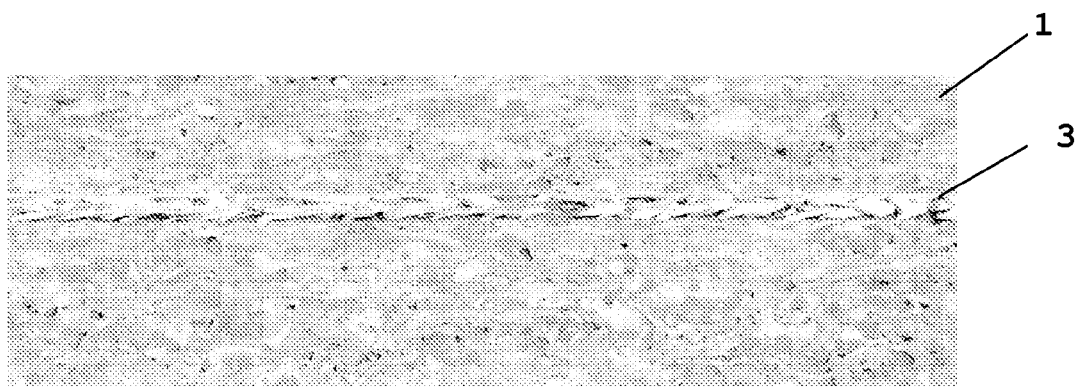
FIG. 2 represents the welding rod according to the invention joining jasped floor-covering elements.

Contrary to a welding rod 2 according to the prior art (FIG. 1), the decorative welding rod 3 according to the invention (FIG. 2) presents the advantage of being visually integrated to multicolour surface covering elements 1.

In the welding rod according to the invention, components A and B have a different colour, meaning that said components have two different type of colour, or have a different shade of the same colour.

In a preferred embodiment, the PVC of component A has a k-value comprised between 65 and 80, more preferably between 70 and 75, and the PVC of component B has a k-value comprised between 57 and 65, the "k-value" referring to the molecular weight of PVC, based on measurements of viscosity of a PVC solution. More preferably the component B comprises a PVC polymer having a k-value of 62, or even more preferably, comprises a PVC polymer having a k-value of 62 and an additional PVC polymer having a k-value of 60 and representing between 0 and 50 phr, "phr" meaning parts per hundred parts by weight of the PVC polymer having the higher k-value in component B, i.e. a k-value of 62.

Preferably, the composition of component A and the composition of component B comprise 40 to 70 phr, and 40 to 90 phr respectively, of an usual plasticizer, such as for instance a phthalate plasticizer, a benzoate plasticizer, a phosphate plasticizer, an adipate, a citrate, a trimellitate, a triglyceride, or a mixture of plasticizers, the choice of the plasticizer being not particularly critical.

The composition of component A and the composition of component B comprise 0 to 10 phr of a usual stabiliser, such as epoxidized soya bean oil, or a mixture of stabilisers. More preferably, the compositions further comprise 1 to 6 phr of a CaZn stabiliser.

Preferably, the composition of component A and the composition of component B comprise other usual additives for PVC formulations in the range of 0 to 1.5 phr. The compositions may comprise 0 to 0.2 phr of stearic acid, and/or 0 to 0.8 phr of a processing aid.

Preferably, the composition of component A the composition of component B comprise any suitable pigment, or any suitable mixture of pigments, the pigments being chosen according to aesthetic considerations. For example, it may be $TiO_2$ alone or $TiO_2$ in combination with another pigment such as for example (C.I. red 144, C.I. Black 7, C.I. Yellow 95 or 110, C.I. Blue 15:1, C.I. Green 7, C.I. Violet 19). The quantity of pigments used in component A and component B depends of the desired final colour. Preferably, the pigment or mixture of pigments represent between 0.01 and 5 phr in component A and between 1 and 5 phr in component B.

Regarding the composition of component A, "phr" means parts per hundred parts by weight of the PVC polymer, and regarding the composition of component B, "phr" means parts per hundred parts by weight of the PVC polymer having the higher k-value.

Examples of compositions of component A and component B are given in tables 2 and 3. For simplification reasons, the examples refer to a black and white welding rod. However, it should be understood that any suitable pigment, or association of pigments, could be used in these examples.

TABLE 2 composition of component A for a welding rod according to the invention.

| | Component A (PVC and additives in phr) | | | | | |
|---|---|---|---|---|---|---|
| | PVC Phr k-value | Plasticizer | CaZn stabilizer | Stabilizer | Stearic acid | Pigment (Black + $TiO_2$) |
| A1 | 100 k-65 | 54 | 2.5 | 3 | 0.1 | 1 |
| A2 | 100 k-80 | 60 | 2.5 | 3 | 0.1 | 1 |
| A3 | 100 k-70 | 58 | 2.5 | 3 | 0.1 | 1 |
| A4 | 100 k-70 | 56 | 1 | 5 | 0.1 | 1 |
| A5 | 100 k-65 | 40 | 2.5 | 10 | 0.1 | 1 |
| A6 | 100 k-80 | 70 | 2.5 | 0 | 0.1 | 1 |
| A7 | 100 k-70 | 60 | 2.5 | 1 | 0.1 | 1 |
| A8 | 100 k-70 | 58 | 2.5 | 3 | 0.1 | 1 |
| A9 | 100 k-70 | 56 | 2 | 5 | 0.1 | 1 |
| A10 | 100 k-70 | 40 | 1 | 10 | 0.2 | 2.5 |
| A11 | 100 k-70 | 70 | 6 | 0 | 0 | 3 |
| A12 | 100 k-70 | 55 | 3 | 3 | 0.1 | 2 |
| A13 | 100 k-70 | 60 | 3 | 3 | 0.1 | 1.5 |

TABLE 3 composition of component B for a welding rod according to the invention.

| | Component B (PVC and additives in phr) | | | | | | | |
|---|---|---|---|---|---|---|---|---|
| | PVC Phr k-value | PVC k-60 | Plasticizer | CaZn stabilizer | Stabilizer | Processing aid | Stearic acid | Pigment ($TiO_2$) |
| B1 | 100 K-57 | 26 | 68 | 3.2 | 4 | 0.64 | 0.26 | 1 |
| B2 | 100 K-65 | 26 | 77 | 3.2 | 4 | 0.64 | 0.26 | 1 |
| B3 | 100 K-62 | 0 | 60 | 2.5 | 3.2 | 0.5 | 0.2 | 1 |
| B4 | 100 K-62 | 50 | 89 | 3.8 | 4.8 | 0.8 | 0.31 | 1 |
| B5 | 100 k-62 | 26 | 68 | 3.2 | 4 | 0.64 | 0.26 | 1 |
| B6 | 100 k-62 | 26 | 74 | 3.2 | 4 | 0.64 | 0.26 | 1 |
| B7 | 100 k-57 | 0 | 40 | 3.2 | 10 | 0.64 | 0.26 | 1 |
| B8 | 100 k-65 | 35 | 90 | 3.2 | 0 | 0.64 | 0.26 | 1 |
| B9 | 100 k-62 | 26 | 72 | 3.2 | 6 | 0.64 | 0.26 | 1 |
| B10 | 100 k-62 | 0 | 40 | 1 | 10 | 0.8 | 0 | 2.5 |
| B11 | 100 k-62 | 50 | 90 | 6 | 0 | 0 | 0 | 2 |
| B12 | 100 k-62 | 20 | 65 | 3 | 5 | 0.6 | 0.2 | 0.5 |
| B13 | 100 k-62 | 30 | 75 | 3 | 3 | 0.6 | 0.2 | 3 |

Any of the compositions A1 to A13 can be associated to any of the compositions and B1 to B13, provided that the PVC of component A has a higher melt viscosity and/or a higher melting point, than the PVC of component B. Furthermore, any of the compositions A1 to A13 can be associated to any of the compositions B1 to B13 in a ratio component A/component B comprised between 10/90 and 50/50.

In the examples of tables 2 and 3, the PVC having a k-value of 80 is Norvinyl 58060, the PVC having a k-value of 70 is Norvinyl® 57060, the PVC having a k-value of 65 is Norvinyl® 56560, the PVC having a k-value of 62 is Norvinyl® S6261, the PVC having a K-value of 60 is Pevikon® P602 from, and the PVC having a k-value of 57 is Norvinyl® 55745, all from Ineos polymers. The plasticizer is Di-isodecylphtalate from ExxonMobil Chemical, the CaZn stabilizer is Interlite® ZP 8691 from Akzo Nobel, the stabilizer is the Epoxidized soyabean oil from Akzo Nobel or alternatively Emery Oleochemicals, the stearic acid is Tefacid 1 VT 65 from AAK AarhusKarlshamn AB, the processing aid is Degalan® 10F from Evonik, the pigment are from Ciba, or alternatively from Clariant, Evonik, Tronox, Tiona and/or Kemira.

The method to produce the welding rod according to the present invention comprises the step of mixing two components of different viscosity, one in the form of granules and the other in the form of a powder, the granule composition comprising a PVC having a higher melt viscosity and/or a higher melting point, than the PVC of the powder composition.

One or several component A of different colour, in the form of granules, is mixed with component B in the form of a powder (dry blend) in a ratio component A/component B of between 10/90 to 50/50, preferably 30/70, before being extruded in an extruder. The extruder is preferably a low shear single screw extruder operating at a mixing speed of between 20 and 40 rpm/min, and at extrusion temperatures of between 170 and 180° C.

The granules and the powder are obtained by any suitable method, preferably by granulating a cord or a sheet or film, obtained by the extrusion or the calendering of a composition of component A or component B. Preferably, the PVC granules of component A have a size in relation to the design to be achieved and can vary from 0.1 to 6 mm, preferably from 2 to 5 mm, more preferably from 3 to 5 mm, even more preferably from 4 to 5 mm. Preferably, component B is a dry blend of the elements composing component B.

For example, a composition of component A of one colour, comprising a PVC having a k-value of 70, is extruded than cooled before being granulated in a granulator to get granules having a size of around 6 mm. Component A granules are mixed in a conventional mixer with component B, component B being in the form a dry blend of a PVC having a k-value of 62 and a PVC having a k-value of 60. Then, the mixture of component A and component B is extruded in a Cincinnati Extruder having a single screw (Length/Diameter=25, Diameter=60 mm) working at 25 rpm and at E1=170° C., E2=175° C., E3=180° C., E4=175° C., A=170° C. in its various heating zones. To obtain a welding rod of the desired colour, one or several granules of component A of different colours, or of different shades of the same colour, may be mixed with a component B of another colour, or of a different shade of the same colour, or colours, as component A. The pigment, or mixture of pigments, of component A and component B are any suitable pigments and are chosen to get a welding rod with a colour substantially identical or corresponding to the one of the floor-covering elements to join.

Preferably, the welding rod according to the invention has a diameter of between 3 and 5 mm, preferably between 3.5 and 4.5 mm.

The welding rod according to the present invention does not have the same composition as the covering elements it has to join; however, the welding rod is visually integrated to the pattern of the surface covering it has to join, meaning that the ratio between component A and component B will differ between different floorings dependent on flooring colour and pattern.

Different properties of different examples of welding rods according to the invention were assessed to evaluate their visual aspect, their cleaning property, their seam strength and their installation property (tables 4 and 5).

The visual aspect is judged according to classes (class 1 to 3) wherein "1" refers to a unique and homogenous colour, "2" to a multicoloured aspect but with visible and discoloured regular material (component B), "3" to an acceptable aspect but with a slight effect, "4" to multicoloured aspect wherein component A granules partly have melted but still giving a visible positive effect and with a minimum of discolouration (third colour), and "5" to multicoloured aspect wherein the contrast between component A and component B are distinct and no discolouration (third colour) of component B can be seen.

The cleaning properties are assessed in a test consisting of putting the welded rod in contact with a mixture comprising sand, oil, asphalt for two hours in a rotating drum, and after that, cleaning the surface with a rotating pad in combination with a detergent and water. A judgement (class 1 to 5) is then given by comparing the results to a grey scale. If class 3 is reached, the cleaning is judged as acceptable and when class 4 and 5 are reached, the cleaning is judged as good.

The seam strength is assessed with an equipment for tensile strength measurements. An increasing tensile force is applied to the welding rod until breakage occurs and the maximum force is recorded. The test samples have a minimum length of around 150 mm and a width of around 50 mm. The welding rod is centrally located across each test samples. A seam strength below 240 N/50 mm is judged as not enough, above 600 N/50 mm as good, and in-between as acceptable.

The installation property is assessed in a test where the easiness of welding, cutting and getting an even and smooth rod surface after cutting, are evaluated. The welding properties are judged according to classes (class 1 to 5) wherein class 2 and 3 refer to a welding which can be done without getting any holes or getting an uneven rod surface after cutting, and class 4 and 5 refer to situations wherein the welding and the cutting can be done easily.

TABLE 4

Welding rods properties for examples of welding rods according to the invention.

| | Components | Ratio A/B | Aspect | Cleaning | Seam strength N/50 mm | Installation property |
|---|---|---|---|---|---|---|
| Ex 1 | A1/B4 | 5/95 | 1 | 3 | 800 | 3 |
| Ex 2 | A1/B4 | 10/90 | 2 | 3 | 820 | 4 |
| Ex 3 | A1/B4 | 30/70 | 3 | 3 | 755 | 4 |
| Ex 4 | A1/B4 | 50/50 | 3 | 3 | 409 | 3 |
| Ex 5 | A1/B4 | 60/40 | 2 | 3 | 350 | 3 |
| Ex 6 | A3/B4 | 10/90 | 5 | 3 | 790 | 4 |
| Ex 7 | A3/B4 | 30/70 | 5 | 3 | 679 | 4 |
| Ex 8 | A3/B4 | 50/50 | 5 | 3 | 488 | 3 |
| Ex 9 | A5/B1 | 10/90 | 4 | 2 | 778 | 4 |
| Ex 10 | A5/B1 | 30/70 | 5 | 3 | 756 | 4 |
| Ex 11 | A5/B1 | 50/50 | 4 | 3 | 700 | 4 |
| Ex 12 | A1/B9 | 10/90 | 2 | 3 | 809 | 4 |
| Ex 13 | A1/B9 | 30/70 | 3 | 3 | 761 | 4 |
| Ex 14 | A1/B9 | 50/50 | 4 | 3 | 456 | 3 |
| Ex 16 | A3/B6 | 10/90 | 5 | 3 | 833 | 4 |
| Ex 17 | A3/B6 | 30/70 | 5 | 3 | 801 | 4 |
| Ex 18 | A3/B6 | 50/50 | 5 | 3 | 504 | 3 |
| Ex 19 | A1/B7 | 10/90 | 4 | 2 | 590 | 3 |

TABLE 4-continued

Welding rods properties for examples of welding rods according to the invention.

|  | Components | Ratio A/B | Aspect | Cleaning | Seam strength N/50 mm | Installation property |
|---|---|---|---|---|---|---|
| Ex 20 | A1/B7 | 30/70 | 5 | 3 | 500 | 3 |
| Ex 21 | A1/B7 | 50/50 | 5 | 3 | 402 | 3 |
| Ex 22 | A6/B9 | 10/90 | 5 | 3 | 678 | 4 |
| Ex 23 | A6/B9 | 30/70 | 5 | 4 | 455 | 3 |
| Ex 24 | A6/B9 | 50/50 | 5 | 4 | 230 | 2 |

TABLE 5

Welding rods properties for examples of welding rods according to the invention.

|  | Components | Ratio A/B | Aspect | Cleaning | Seam strength N/50 mm | Installation property |
|---|---|---|---|---|---|---|
| Ex 25 | A5/B2 | 10/90 | 3 | 3 | 860 | 4 |
| Ex 26 | A5/B2 | 30/70 | 3 | 3 | 778 | 4 |
| Ex 27 | A5/B2 | 50/50 | 3 | 4 | 732 | 4 |
| Ex 28 | A3/B2 | 10/90 | 3 | 3 | 801 | 4 |
| Ex 29 | A3/B2 | 30/70 | 4 | 4 | 743 | 4 |
| Ex 30 | A3/B2 | 50/50 | 4 | 4 | 724 | 4 |
| Ex 31 | A2/B2 | 10/90 | 5 | 4 | 688 | 4 |
| Ex 32 | A2/B2 | 30/70 | 5 | 4 | 555 | 3 |
| Ex 33 | A2/B2 | 50/50 | 5 | 3 | 220 | 2 |
| Ex 34 | A1/B1 | 10/90 | 3 | 3 | 678 | 4 |
| Ex 35 | A1/B1 | 30/70 | 4 | 3 | 655 | 4 |
| Ex 36 | A1/B1 | 50/50 | 4 | 4 | 543 | 3 |
| Ex 37 | A9/B1 | 10/90 | 5 | 3 | 666 | 4 |
| Ex 38 | A9/B1 | 30/70 | 5 | 3 | 555 | 3 |
| Ex 39 | A9/B1 | 50/50 | 5 | 4 | 521 | 2 |
| Ex 40 | A6/B1 | 10/90 | 5 | 3 | 545 | 3 |
| Ex 41 | A6/B1 | 30/70 | 5 | 3 | 567 | 2 |
| Ex 42 | A6/B1 | 50/50 | 5 | 3 | 202 | 2 |

It appears that the welding rods, according to the invention, have good installation properties (including cutting), and that their seam strength towards the flooring is good. In the tensile strength test of the welding rod itself, it is generally admitted that the modulus at 100% extension has to be above 6 N/mm², and that at 50% extension it has to be above 3 N/mm². The welding rods according to the invention have a modulus at 100% extension between 7 and 8 N/mm², and between 4 and 5 N/mm² at 50% extension.

The invention claimed is:

1. A method for producing a multicolour decorative welding rod for joining elements of a decorative surface covering, said welding rod comprising a PVC-based component A having k-value of between 65 to 80, and a PVC-based component B having a k-value of between 57 to 65, in a ratio of component A/ component B comprised between 30/70 to 50/50, said components A and B being associated in such a way that the composition of said component A comprises a PVC having a higher melt viscosity and/or a higher melting point, than the PVC of said component B, said components A and B being of a different colour, said method comprising the steps of:
   forming a mixture comprising the component A and the component B, wherein the component A is in the form of granules having a size from 0.1 to 6 mm, and the component B is in the form of a dry blend powder; and
   extruding the mixture to form the welding rod.

2. The method according to claim 1, wherein the granules of component A are obtained by granulating a rod obtained by a separated extrusion step.

3. The method according to claim 1, wherein the granules of component A are obtained by shredding a sheet.

4. The method according to claim 1, wherein the granules of component A have a size from 2 to 5 mm.

5. The method according to claim 1, wherein the granules of component A have a size from 3 to 5 mm.

6. The method according to claim 1, wherein component A and component B include a pigment or mixture of pigments.

7. The method according to claim 6, wherein the pigment or mixture of pigments represents between 0.01 and 5 phr in component A and between 1 and 5 phr in component B, wherein regarding the composition of component A, "phr" means parts per hundred by weight of the PVC polymer of component A, and regarding the composition of component B, "phr" means parts per hundred by weight of the PVC polymer of component B, respectively of the PVC polymer of component B having the higher k-value, if component B comprises two PVC polymers with different k-values.

8. The method according to claim 1, wherein the welding rod has a diameter between 3 and 5 mm.

9. The method according to claim 1, wherein component A comprises a PVC having a k-value of 70.

10. The method according to claim 1, wherein the component B comprises a PVC polymer having a k-value of 62.

11. The method according to claim 10, wherein the component B comprises an additional PVC polymer having a k-value of 60.

12. The method according to claim 1, wherein the ratio of component A/ component B is 30/70, and wherein component A comprises a PVC having a k-value of 70 and component B comprises a PVC polymer having a k-value of 62 and 26 phr of an additional PVC polymer having a k-value of 60, wherein "phr" means parts per hundred parts by weight of the PVC polymer having the higher k-value in component B.

* * * * *